United States Patent Office 3,305,868
Patented Feb. 21, 1967

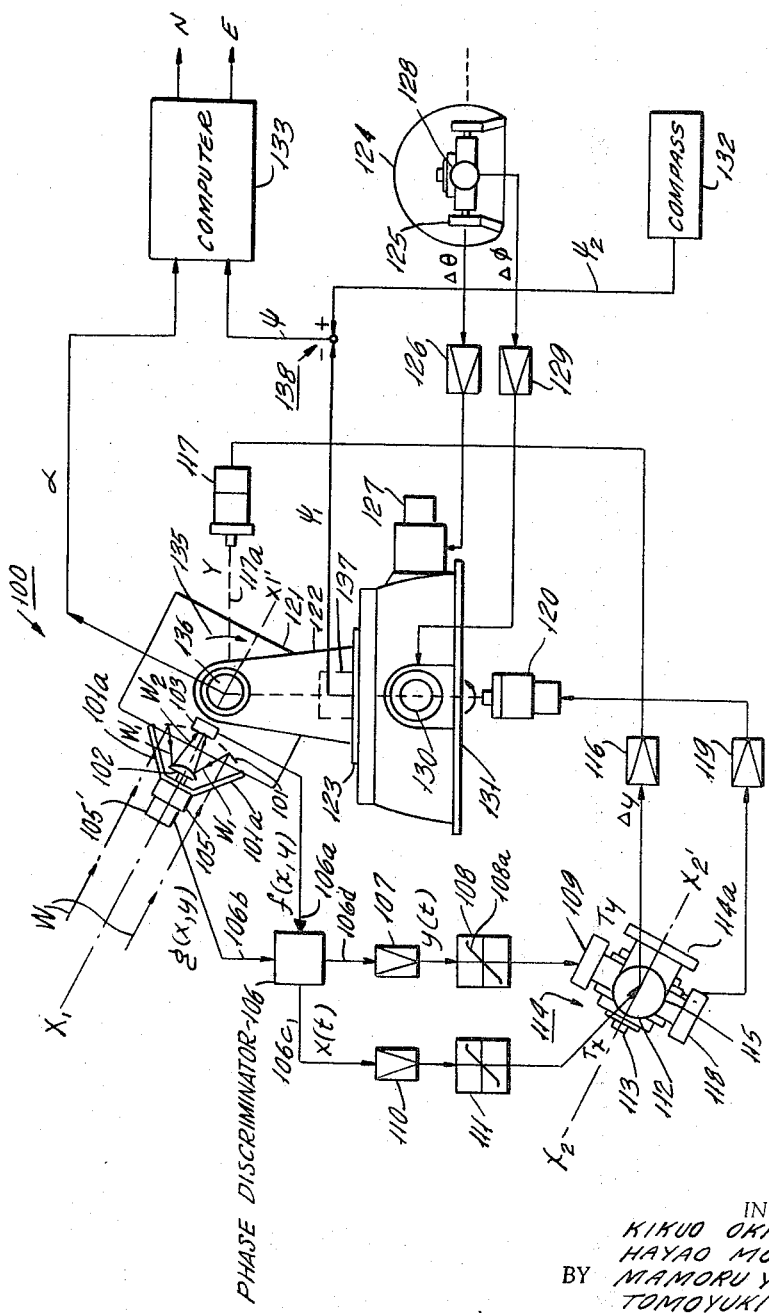

3,305,868
AUTOMATIC POSITION DETECTING SYSTEM
Kikuo Oki, Hayao Motomatsu, Mamoru Yamaguchi, and Tomoyuki Watanabe, Shiba Mita, Minatoku, Tokyo, Japan, assignors to Nippon Electric Company, Ltd., Tokyo, Japan
Filed Mar. 11, 1964, Ser. No. 350,971
Claims priority, application Japan, Mar. 19, 1963
38/14,726
4 Claims. (Cl. 343—117)

The instant invention relates to position detecting means and more particularly to an automatic positioning detecting system preferably for ascertaining the longitudinal and latitudinal position of a vessel by receipt of electromagnetic waves transmitted from a body in space, by means of a passive radar apparatus having a gyro device interlocked therewith.

In situations where it is desired to detect the present position of a vessel sailing along the surface of the earth, such as a surface vessel or a submarine, as the case may be, when it is desired to determine the position, either temporarily or on a continuous basis, the conventional methods employed are manual calculation of the position on the basis of data obtained from broadcast or astronomical observation means. As regards the calculation of position by the broadcast method, the accuracy of such a method decreases with the distance between a fixed point and the position to be measured increases. In the case of detecting position or location by astronomical observation, the employment of this method is heavily dependent upon weather conditions as to its possible use even though the astronomical method has been shown to have considerably high accuracy.

The instant invention overcomes the defects of the prior art position detection methods through the employment of an electronic system incorporating the use of both radar and gyroscopic systems.

The instant invention is comprised of a position detection system having radar means which is designed to receive electromagnetic waves from a body in space, which may be, for example, the sun, or some artificial satellite. The radar means is automatically controlled so as to completely align itself such that its angular orientation coincides with the angle of incidence of waves emanating from the body existing in space. Prior to the alignment between the radar angular orientation and the angle of incidence of the incoming electromagnetic waves, the radar means generates a deviation signal which is applied to gyro means, which is designed to maintain a predetermined angular orientation in the absence of any outside influences. Upon receipt of the deviation signal, the gyro means undergoes physical movement in the direction of alignment with the angle of incidence of the incoming electromagnetic waves being received by the radar means. The physical movement of the gyro means is detected by suitable detector or pick-off means which in turn, generates a signal to control a radar position adjusting means or motor means so as to rotate the radar antenna means in order to align the antenna central axis to coincide with the angle of incidence of the incoming electromagnetic wave. The deviation signal becomes modified as the antenna means moves into alignment with the angle of incidence of the incoming electromagnetic waves with the feed-back system arrangement continuing to operate until a null condition exists between the outputs of the gyro means and the radar means. When the center axis of the passive radar antenna coincides with the incidence direction of the electromagnetic, or radio waves, the output signals of the passive radar system provides an indication that the deviation is null and when the center axis deviates from the incidence direction the signal generated represents the deviation angle. The preserve axis of the gyro means is a particularly predetermined axis selected for the gyro device and it is preserved, or maintained, in this predetermined direction by normal gyro action until there is application of an external force or torque.

The position of the vessel is then calculated by computer means based on the deviation of the center axis of the antenna or of the preserve axis of the gyro means. The calculations may be made based either on a rectangular coordinate system, or any other suitable coordinate system which may be desired.

In accordance with the detecting system of the instant invention, when the output torque of the torque motor in the gyro means, which is controlled by a deviation signal, is properly selected, the preserve axis of the gyro will not respond to noise having short duration, which noise is produced by the rolling and pitching of a vessel or by the following error of the device which may be mixed with the deviation signal of the antenna center axis because of the integrating action of the gyro. On the other hand, the gyro means responds correctly to the deviation signal component generated by the radar means, making it possible to substantially eliminate the influence of the noise and also making it possible to improve response characteristics of the antenna controlling servo system, since the antenna means will follow the preserved axis of the gyro means so that the delayed time constant of the passive radar means receiving equipment, which detects the deviation signal, and the phase discriminator, which generates the incidence direction of the electromagnetic waves, will not directly effect the control servo system of the radar antenna means.

It is therefore one object of the instant invention to provide novel means for determining the position of a vessel traveling along the surface of the earth.

Still another object of the instant invention is to provide novel means for detecting the position of a vessel traveling along the surface of the earth comprising passive radar means and gyro means cooperating to detect position in conjunction with an object in space.

Another object of the instant invention is to provide novel means for detecting the position along the surface of the earth of traveling vessels and the like, comprising passive radar means and gyro means, wherein said radar means generates a deviation signal between the radar antenna orientation and the angle of incidence of incoming electromagnetic waves for operating said gyro means, and wherein the operation of said gyro means automatically sets the position of said antenna means so as to coincide with the angle of incidence of the incoming electromagnetic waves.

Still another object of the instant invention is to provide novel means for detecting the position along the surface of the earth of traveling vessels and the like, comprising radar means for receiving electromagnetic waves from an object in space for generating a deviation angle signal between said incidence direction and the antenna orientation and gyro means controlled by said deviation angle signal for aligning said radar means to produce a null condition between the orientations of said radar antenna meas and said gyro means.

Still another object of the instant invention is to provide novel means for detecting the position along the surface of the earth of traveling vessels and the like, comprising passive radar means and gyro means interconnected with one another, wherein said radar means generates a deviation signal between its own orientation and electromagnetic waves received from a space object for altering the position of said gyro means and wherein said gyro means, upon movement thereof, controls the positioning of said radar means and antenna to bring said radar means and said gyro means into alignment and further comprising computer means utilizing the deviations experienced by either said radar or said gyro means for generating a position calculation.

Another object of the instant invention is to provide novel means for detecting the position along the surface of the earth of traveling vessels and the like, comprising interconnected passive radar means and gyro means for aligning said radar means to coincide with the incidence angle of electromagnetic waves received from the space object, wherein said radar means is arranged upon an automatically stabilized platform to reduce the effects of pitching and rolling of the vessel upon the position calculation.

Still another object of the instant invention is to provide novel means for detecting the position of surface vessels and the like, comprising interconnected radar means and gyro means, cooperating to align the radar means antenna in coincidence with received electromagnetic waves from an object in space and further, comprising compass means for establishing the azimuth of said radar means relative to a true north position.

These and other objects of the instant invention will become apparent when reading the accompanying description and drawings in which:

The figure is a diagram partially in block form and partially in physical form, showing one exemplary embodiment for the system of the instant invention.

Referring now to the drawings, the sole figure shown therein depicts a position detection system 100 designed in accordance with the principles of the instant invention comprising a passive radar antenna 101. Electromagnetic waves, represented by the dashed lines W received from a space object, impinge upon the surface of the parabolic antenna 101 and are reflected at W1 so as to impinge upon a collector means 102. The waves W1 are reflected by the collector 102 so as to be deflected in the direction W2, which waves are ultimately received at an opening of receiving waveguide means 103. The signal at the output of waveguide means 103 is a voltage signal $f(x, y)$ which is proportional to the strength of the received electromagnetic waves. The output of waveguide means 103 is impressed upon one input terminal 106a of phase discriminator means 106.

With the attitude of the antenna 101, as shown in the sole figure, the center axis of antenna 101 is represented by the center line X1–X1' and as shown in the figure, is substantially directed and may even be considered parallel to the incidence angle of the incoming electromagnetic waves W. Considering a rectangular coordinate system $(x, y, z)$, the $xz$ plane of the coordinate system is the plane of the figure and the $z$ axis of the coordinate system would represent the direction of the acceleration of gravity which is normally directed vertically downward. The $y$ direction of the rectangular coordinate system would then be perpendicular to and out of the plane of the figure so that the $xy$ plane is the horizontal plane.

The antenna means 101 is provided with suitable mounting means 101a for securing synchronous motor means 105 and signal generator means 105' to the antenna means 101. The synchronous motor and synchronous generator means 105 and 105', respectively, are provided for the purposes of generating a synchronous signal $g(x, y)$ which corresponds to rotational movement about the $y$ axis and rotational movement about the $z$ axis of the coordinate system assumed above. The motor, generator and collector means 105, 105' and 102, respectively, are eccentrically mounted in order to produce a slight displacement of directivity of the antenna collector 102 about the axis X1–X1' by motor 105.

The signal $g(x, y)$ is impressed upon a second input terminal 106b of phase discriminator 106. The two input signals $f(x, y)$ and $g(x, y)$ are treated by phase discriminating means 106 in such a way as to generate a signal $y(t)$ and $x(t)$, which correspond to the vertical deviation and the horizontal deviations around the center axis X1–X1'.

Since the operating principles of the system are the same for both deviation signals $x(t)$ and $y(t)$, which signals are generated at the output terminals 106c and 106d, respectively, the description hereinafter set forth will be given with reference to the $y$ axis deviation for purposes of simplicity, it being understood that the $x$ deviation operation is basically the same. The deviation signal $y(t)$ is first amplified by amplifier means 107 and then undergoes a limiting operation by limiter means 108, which functions to limit the amplitude of the incoming signal to a predetermined amount substantially in accordance with the curve 108a, shown within the limiter means "black box" 108. Thus, the deviation signal $y(t)$, is applied to the torque motor 109 of gyro means 114. While the figure shows gyro means 114 displaced from the housing 121 of antenna 101, it should be understood that the face 114a of gyro means 114 is secured in any suitable manner to the interior of the antenna housing 121. Gyro means 114 is further provided with a suitable displacement detector, or pick-off means 115, having the function of detecting the deviation between the gyro means preserve axis and the gyro means base 114a. The pick-off means 115 is set in such a way that with the gyro means 114 assuming the attitude of the figure such that it is in alignment with the axis X2–X2', that the pick-off means 115 will generate a zero deviation signal. The gyro means 114 is further installed within the housing 121 so that vertical displacement of the gyro occurs about the Y' axis, which is perpendicular to the plane of the figure and in the direction out of the plane of the figure and further, so that horizontal displacement occurs about the Z' axis which lies in the plane of the figure and is perpendicular to the X2–X2' axis. The X' axis of the gyro is set along the preserve axis X2–X2'. Gyro means 114 is further so set up so that the Y' axis of the gyro means 114 is parallel with the assumed Y axis of the antenna means 101.

When the gyro means 114 is deviated from the preserve axis X2–X2' by the torque motor means 109 in the vertical direction, then the deviation $\Delta y$ is detected by the pick-off means 115. The pick-off means 115 generates a signal representative of this deviation $\Delta y$, which signal is amplified by amplifier means 116 and impressed upon a motor means 117 which operates to rotate the antenna housing 121 about the Y axis in the clockwise direction shown by arrow 135 (or counterclockwise, as the case may be). The mechanical coupling is represented by the dashed line 117a. The servo system for driving the antenna means housing 121 is constructed so as to eliminate the deviation signal $\Delta y$ by employing the deviation of the antenna housing 121 as a feed-back signal to pick-off means 115 by means of the readjusted signal $g(x, y)$ which again alters the deviation of the gyro means 114 from its preserve axis X2–X2'. In the instant case, the direction of the signal applied to the torque motor 109 is selected in such a manner as to displace the preserve axis X2–X2' of the gyro toward the direction which causes the center axis of antenna 101 to move into coincidence with the incidence direction of the electromagnetic waves W, thereby also placing the preserve axis X2–X2' of the gyro means in coincidence with the direction of the electromagnetic waves W.

The above mentioned principles may likewise be applied to the operation around the assumed Z axis although in the sole figure the X1–X1' axis is controlled to rotate upon the horizontal stable platform 123 instead of driving the Z axis of the antenna means directly, which is done in order to facilitate the calculation of the latitude and longitude readings as will be described hereinafter, and which is based upon the same principles.

The antenna housing 121 is rotatably supported by a pair of support members 122 (only one of which can be seen in the figure) in order to enable housing 121 to rotate freely in the vertical plane (i.e., with freedom to rotate around the y axis) and is further mounted to rotate with freedom in the horizontal plane which is provided for by the rotational mounting of the stable platform means 123 which is free to rotate about the vertical axis 123a, in a manner to be more fully described.

The stable platform 123 is stabilized by means of a horizontal stabilizing system comprised of a leveling instrument 124, which while shown displaced in the figure, is secured to the support members 122 when utilized in an operating system. The leveling system is provided for the purpose of compensating for the pitching and rolling of the vessel upon which the system 100 is mounted by generating output signals for readjustment of the stable platform 123 so as to constantly maintain stable platform 123 in the horizontal plane. For example, if the surface vessel undergoes any pitching or rolling, this causes the balancing elements 125 and, or 128, to undergo movement and hence to generate the signals $\Delta\theta$ and $\Delta\phi$, respectively, representative of the deviations experienced by instrument 124. These signals are amplified by amplifying means 126 and 129, respectively, which signals are in turn, impressed upon the servo motors 127 and 130, respectively, for the purpose of stabilizing the stable platform 123 in the horizontal direction. The stable platform 123 is mounted upon a suitable gimbal mechanism 131, acting to couple the corrective signals to the appropriate mechanical correction for the stable platform 123.

The angle of the antenna axis X1–X1' and the horizontal stable platform 123 corresponds to the angle of elevation $\alpha$ of the bodies existing in space relative to the surface of the earth. This angle is detected by suitable detection means 136 which generates a signal representing the angle of inclination $\alpha$ which in turn, is impressed upon one input of a computer means 133.

The system 100 is further provided with a compass means 132, which generates a signal along a preserving axis, which is representative of the true north position $\psi_2$. This signal is summed with another azimuth signal $\psi_1$ which is generated by the pick-off means 137, which signal represents the amount of rotation of the stable platform about its vertical axis 123a. The two signals $\psi_2$ and $\psi_1$ when summed at 138 generated a resultant signal $\psi$ which represents the true azimuth of the antenna means 101.

The actual position of the vessel upon which the system 100 is mounted, is then calcuated by employing the azimuth $\psi$ and the angle of elevation $\alpha$ data, together with the position of the object in space and the time at which the observation is being made with the result being the true position in latitude and longitude of the surface vessel.

It should be noted that the above described gyro system is not necessarily limited to the gyro units described herein, but they include a stable platform used with an integrating gyro means as a detector, or another device having a characteristic of preserving a direction, or axis in order to attain the objects of the instant invention. As a further modification, the gyro may be installed outside of the antenna housing in lieu of installing it inside of the housing by interlocking the preserve axis of the gyro and the center axis of the passive radar means with a suitable interlock device so as to obtain operation equivalent to that previously described.

When the position of the body (i.e., satellite, spacecraft, et cetera) existing in space is immediately above the antenna means 101, the X component diminishes and control becomes somewhat unstable. In order to overcome this difficulty, the horizontal stable platform means 123 may be tilted to prevent the deterioration of accuracy of detection. The deliberate tilting of platform means 123 can be compensated for by including a compensating factor which takes the tilt into account in the computations performed in computer means 133.

While the exemplary embodiment described herein assumes a choice of a rectangular coordinate system, it should be understood that any orthogonal coordinate system, such as, a cylindrical, spherical coordinate system or otherwise, may be employed, depending only upon the needs of the user and the choice is a mere design consideration.

It can therefore be seen that the instant invention provides a novel position detection system wherein the antenna means follows the gyro means by a servo control system without adding any delay of detection into the passive radar receiver means and the antenna control system phase detector thereby providing quickness of response and increased antenna gain resulting in greatly improved accuracy of detection.

Although there has been described a preferred embodiment of this novel invention, many variations and modifications will now be apparent to those skilled in the art. Therefore, this invention is to be limited, not by the specific disclosure herein, but only by the appended claims.

What is claimed is:
1. An automatic position detecting system mounted upon a moving body comprising:
   a passive antenna means including eccentrically mounted collector means for receiving electromagnetic waves from an object in space;
   first means secured to said antenna means for generating synchronous output signals representing movement along two axes of the antenna coordinate system;
   second means secured to said antenna means for synchronously displacing said antenna collector means along said two axes;
   third means receiving the electromagnetic waves collected by said antenna means and receiving the first output signals generated by said first means for generating second output signals representing the phase difference between the first output signals and the signals collected by said antenna means;
   first and second gyro means for each of said two axes secured to said antenna means each being initially positioned to maintain predetermined preserve attitudes;
   first and second torque motors for respectively displacing said first and second gyro means from their preserve attitudes under control of said second output signals;
   first and second displacement detector means for respectively detecting the amount of displacement experienced by said first and second gyro means;
   first and second motor means respectively receiving signals from said first and second displacement detector means for altering the attitude of said antenna means to null the phase difference between said first means output signals and the electromagnetic waves received by said antenna means.
   platform means for supporting said antenna means;
   stabilizing means for continuously maintaining said platform means in a horizontal plane throughout the position detection operation to prevent reaction of said antenna system to deviations from the horizontal plane and thereby enabling high speed response of the system;
   third means for generating output signals representative of the attitude of said antenna means at any given instant of time.
2. The system of claim 1 wherein said third means is comprised of fourth means for generating a signal representing the azimuthal orientation of said antenna means and fifth means for generating a signal representing the elevational orientation of said antenna means.
3. The system of claim 2 further comprising compass means for generating an output signal representing the angular deviation of said body from true North;

means for summing the output signals of said fourth means and said compass means to generate a resultant azimuthal signal.

4. The system of claim 1 wherein said antenna means is comprised of an antenna reflector for receiving electromagnetic radiation and reflecting the received waves toward said collector; said collector being continuously displaced relatively to said reflector.

References Cited by the Examiner

UNITED STATES PATENTS

| | | | |
|---|---|---|---|
| 2,660,793 | 1/1953 | Holschuh et al. | 343—117 X |
| 2,946,049 | 7/1960 | Stotz | 343—117 X |
| 3,194,949 | 7/1965 | Jasperson | 343—117 X |

RODNEY D. BENNETT, *Acting Primary Examiner.*

CHESTER L. JUSTUS, *Examiner.*

R. E. BERGER, *Assistant Examiner.*